United States Patent
Rajendran et al.

(10) Patent No.: US 11,585,222 B1
(45) Date of Patent: Feb. 21, 2023

(54) CRYOGENIC OIL-FREE DIRECT DRIVE TURBOGENERATOR

(71) Applicant: R&DDynamics Corporation, Bloomfield, CT (US)

(72) Inventors: Muthusamy Rajendran, Bloomfield, CT (US); Charles William Buckley, West Hartford, CT (US); Giridhari L. Agrawal, Simsbury, CT (US); Aren Andreas Johansen, Unionville, CT (US)

(73) Assignee: R&D Dynamics Corporation, Bloomfield, CT (US)

( * ) Notice: Subject to any disclaimer, the term of this patent is extended or adjusted under 35 U.S.C. 154(b) by 0 days.

(21) Appl. No.: 17/820,727

(22) Filed: Aug. 18, 2022

Related U.S. Application Data

(60) Provisional application No. 63/250,684, filed on Sep. 30, 2021.

(51) Int. Cl.
| | |
|---|---|
| *F01D 3/02* | (2006.01) |
| *F01D 3/04* | (2006.01) |
| *F01D 25/12* | (2006.01) |
| *F02C 1/02* | (2006.01) |
| *F02C 7/06* | (2006.01) |

(52) U.S. Cl.
CPC ............ *F01D 3/02* (2013.01); *F01D 3/04* (2013.01); *F01D 25/125* (2013.01); *F02C 1/02* (2013.01); *F02C 7/06* (2013.01); *F05D 2220/76* (2013.01); *F05D 2240/52* (2013.01); *F05D 2260/20* (2013.01); *F05D 2260/96* (2013.01)

(58) Field of Classification Search
CPC . F01D 3/02; F01D 3/04; F01D 25/125; F02C 1/02; F02C 7/06; F05D 2220/76; F05D 2240/52; F05D 2260/20; F05D 2260/96
USPC .................................... 415/104–107
See application file for complete search history.

(56) References Cited

U.S. PATENT DOCUMENTS

| | | | |
|---|---|---|---|
| 6,443,690 B1 * | 9/2002 | Zabrecky | F01K 7/20 |
| | | | 415/29 |
| 7,948,105 B2 * | 5/2011 | Agrawal | F01D 15/10 |
| | | | 60/657 |

(Continued)

*Primary Examiner* — Hoang M Nguyen
(74) *Attorney, Agent, or Firm* — Lathrop GPM LLP; William T. Griffith

(57) ABSTRACT

A cryogenic oil-free direct drive turbogenerator for gas liquefaction plant applications is described. The pressure energy from cryogenic gas is expanded through a turbine and the power generated is converted into electricity through a directly driven generator and a power electronics arrangement. The machinery can withstand very cold temperature operation (e.g., <−425° F.) by isolating the cold turbine side from the warmer side of the machine turbine end and has a hermetically sealed design wherein the process gas is fully contained from leaking at operating pressures. A unique gas injection scheme uses seal gas segregation, thrust bearing cooling and pressure balance for thrust control which is accomplished through a pressure regulator arrangement. Also described is an algorithm for speed control and overspeed protection through the power electronics system. The rotating components of the turbogenerator are supported on foil gas bearings for oil-free operation eliminating extraneous lubrication.

20 Claims, 3 Drawing Sheets

(56) References Cited

U.S. PATENT DOCUMENTS 8,893,499 B2 * 11/2014 Maier .................... H02K 5/161
60/647
2013/0091869 A1 * 4/2013 Bardon ................. F25J 1/0288
62/6

* cited by examiner

CRYOGENIC OIL-FREE DIRECT DRIVE TURBOGENERATOR

CROSS-REFERENCE TO RELATED APPLICATION

This application claims the benefit of U.S. Provisional Application Ser. No. 63/250,684, filed Sep. 30, 2021, which is incorporated herein by reference in its entirety.

FIELD OF THE INVENTION

The present invention relates to rotating machinery and particularly to turbine-driven generators used in cryogenic gas plants for liquefaction of process gases such as hydrogen, helium, nitrogen, oxygen, natural gas, etc. The present invention enables efficient, reliable, oil-free and hermetically-sealed cryogenic liquefaction of industrial gases.

BACKGROUND OF THE INVENTION

Expansion turbines are the most critical rotating component of cryogenic gas liquefaction plants to liquefy the gas energy efficiently. The expansion turbines expand the compressed process gas and produce cryogenic gas by removing energy from the gas using a turbine and an associated rotating assembly. The extracted energy can be recovered back as compression energy using a compressor or converted into electricity using a generator. Hence, a turbine can have a loading mechanism that can be a compressor or a generator.

Efficiency of expansion turbines are critical due to the cost of compression to produce the cryogenic gas. In lighter molecules, like Helium gas, the energy requirement of compression can be 25 units to produce 1 unit of cooling. Current state-of-the-art expansion turbines have poor energy recovery methods using compressors and gearbox/generator arrangements. Traditional expansion turbines are typically compressor-loaded due to the need for an expensive gearbox arrangement for generator-loaded designs. However, compressor-loaded expansion turbines are not widely desired due to high installation costs and complex process cycle requirements to integrate the compression power back into the process loop.

Additionally, traditional expansion turbines generally require lubricants to enable high-speed operation of the rotating assembly to achieve optimum efficiency. Further, the oil lubricant can leak into process due to system failures and operator errors and cause serious damages to cold box.

In view of the foregoing, there is a need for expansion turbine technology which can convert the recovered shaft power from the cryogenic process gas to electricity without a need for gearbox. Additionally, there is a need for expansion turbine technology that does not require lubricants, such as oil, to enable high-speed operation, whereby such lubricants risk process gas contamination. Accordingly, it is a general object of the present invention to provide expansion turbine technology, such as a turbine-driven generator, for use in cryogenic gas plants for liquefaction of process gases such as hydrogen, helium, nitrogen, oxygen, natural gas, etc., that enables efficient, reliable, oil-free and hermetically-sealed cryogenic liquefaction of industrial gases. Gas foil bearings used in the present invention are lubricated by the process gas itself, so there is no possibility of the above-mentioned contamination typically associated with prior art turbomachinery and the drawbacks associated therewith. The present invention provides an innovation to overcome the loading hurdles, operating at cryogenic temperature without any oil contamination of the process gas, and other drawbacks associated with prior art designs.

SUMMARY OF THE INVENTION

The present invention provides an oil-free direct drive turbine generator for use in cryogenic liquefaction plants where the process gas is expanded through a turbine and the resulting shaft power is converted into useful electricity through a generator/power electronics system. The turbogenerator is supported on foil gas bearings for oil-free operation.

The present invention enables very cold temperature operation of the turbogenerator, reducing the heat leak into the process and providing an oil-free machinery system eliminating risk of potential process gas oil contamination. The present invention also eliminates the need for a gear-box assembly and directly couples the turbine assembly to a generator capable of converting the shaft power into electricity in association with a power electronics system which has a high frequency end and a grid frequency end linked through a DC bus.

In one aspect of the present invention, the cold process gas is isolated from the warm end of the machine through a thermal choke and insulator arrangement. The cold conducted from the turbine wheel is insulated by a low conductivity insulator insert. With this arrangement the cold leak from the process end is effectively reduced enabling an innovative machine configuration for cryogenic liquefaction.

In another aspect of the present invention, the net thrust generated due to difference in pressure between the eye of the turbine and the back of the rotating assembly is balanced using a balance piston. The balance piston is injected with pressurized gas which is of same pressure as the eye of the turbine using a regulator. With this arrangement, the cold gas is spared from traveling to the back of the machine for thrust balancing and hence expensive cold leak is eliminated. In another aspect of the present invention, the eye of the turbine is connected with the balance piston cavity through a slow closing/fast opening pilot valve for emergency thrust protection.

In another aspect of the present invention, the machine is hermetically sealed using double seal arrangement of C-seals and O-rings to eliminate process gas leakage through flanges and electrical feedthroughs. In another aspect of the present invention, a seal gas panel is used to inject various gas flows for the machine for reliable operation. The gas injected at the seal location segregate the cold gas leaking into the bearing cavity. The gas injected into thrust bearing cavity enable thermal management of the thrust bearings.

In another aspect of the present invention, the machine speed control is handled by a proprietary algorithm wherein the optimum speed for a given operating point is calculated and provided as a command for the power electronics system to adjust the generator load. The machine is started as a motor flowing the power in reverse direction from the grid/electrical panel into the generator using the power electronics system and transitioned to a power generating condition once the slam valve for the process gas is opened.

In another aspect of the present invention in case of an emergency shutdown wherein the power electronics system loses its ability to transfer the electrical energy from the generator to the grid/electrical panel a brake resistor is incorporated which dissipates the stored rotational energy in the machine protecting the power electronics system from building harmful high voltages and overspeeding the machine to failure.

These and other features of the present invention are described with reference to the drawings of preferred embodiments of a cryogenic oil-free direct drive turbogenerator for use in cryogenic liquefaction plants. The illustrated embodiments of the turbogenerator in accordance with the present invention are intended to illustrate, but not limit, the invention.

DETAILED DESCRIPTION OF THE INVENTION

This patent application claims priority from U.S. Provisional Patent Application No. 63/250,684, filed Sep. 30, 2021, the disclosure of which is incorporated by reference herein in its entirety.

Cryogenic gas liquefaction plants require efficient expansion turbines to cool the process gas (e.g., cryogenic gas) to liquefy. Cryogenic cold leakage detriments the specific energy consumption as the energy used for compressing the process gas for expansion is wasted without aiding in the liquefaction process. Traditional expansion turbines are supported on oil bearings, and, to recover the expanded gas energy into useful electricity, a gearbox unit is coupled to a generator to reduce the speed of the turbine to bull gear speed which could turn the generator at grid frequency. However, as noted above, oil can contaminate the process gas and the gearboxes traditionally used in such systems are expensive and maintenance intensive. The present invention provides an innovative design wherein the turbine is directly connected to the generator without any coupling and the rotating assembly is supported on foil gas bearings for oil-free operation, providing great improvements over prior art designs.

Figure 1:
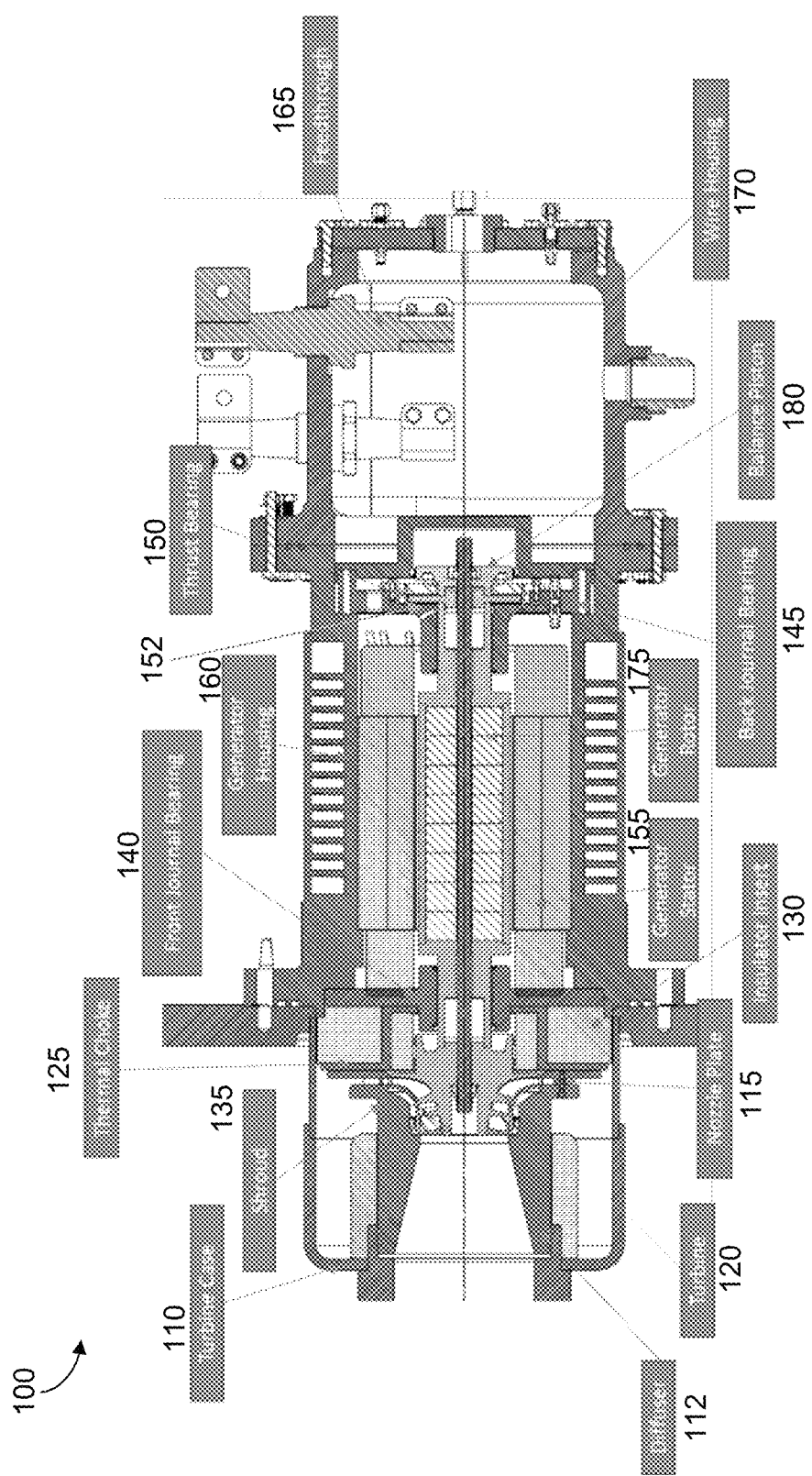
FIG. 1 illustrates a cross-sectional view of a cryogenic oil-free direct drive turbogenerator in accordance with an embodiment of the present invention.

In accordance with the present invention, a cryogenic oil-free direct drive turbogenerator 100 is generally illustrated in FIG. 1. As illustrated, the process gas is collected in a turbine case 110 and directed into a nozzle plate 115. The nozzle plate 115 directs the process gas through the turbine wheel which is expanded to produce cold gas which is diffused through a diffuser 112. The expansion of the process gas through the turbine 120 produces shaft rotation. The cold gas front is segregated from the warmer bearing/generator compartment through a thermal choke 125 and insulator configuration. The thermal choke 125 provides structural support for the aerodynamic components such as nozzle plate 115 and shroud 135 to be mounted and effectively chokes the flow of expensive cold temperature soaking into the warm end of the machine. Any cold leak negatively impacts the specific energy consumption of the liquefaction process. The thermal choke 125 is surrounded by additional low thermal conductivity insulating material to stop the cold from leaking out from the turbine case. Further the turbine case 110 is designed with a skinny wall section to reduce the heat transfer into the main flange. The cold leak from the turbine 120 into the shaft assembly is reduced by an insulator insert 130 which is made of a low thermal conductivity material and blocks the cold. These various means of thermal management reduce the expensive cold leak and protect the warm end of the machine from being affected by cold temperatures.

The rotating assembly is held together as an integral unit through a tie bolt which retains various components through a compression load. The rotating assembly is supported radially at two locations by journal bearings 140, 145 and a thrust disc 152 is secured in place by thrust bearings 150. The tie bolt is pre-stretched with nuts on both sides. The machine is designed as a cartridge assembly which can be assembled into the turbine case 110 and can be easily disassembled for replacement. The generator stator 155 is pressed into the generator housing 160, as shown in FIG. 1, and the lead wires from the generator are routed through the back journal bearing holder and connected to the feedthrough 165 mounted on the wire housing 170. The feedthrough 165 seals the process gas from escaping the wire housing 170 and transfers the electrical power from the generator 100 to the power electronics system. The process gas leaking from the turbine end of the machine to the warm generator end is blocked by injecting seal gas into sets of labyrinth seal. This arrangement injects a small amount of warm gas into the cold stream which is not as detrimental as allowing the cold turbine end gas to leak into the generator side. In accordance with aspects of the present invention, the journal and thrust bearings 140, 145, 150 are preferably hydrodynamic foil gas journal and thrust bearings. These bearings 140, 145, 150 operate in the process gas, and as a result, no extraneous oil lubrication is needed. The seal gas injected is same as the process gas but taken from a warmer location of the plant to reduce compression energy usage.

During operating the turbine 120 turns the generator rotor 175 which in turn interacts with the generator stator 155 and produces high frequency power which will be transmitted out of the machine through the feedthrough 165. The high frequency power is fed into the power electronics system where the high frequency switches converts the power into DC and converts it to the grid frequency power and effectively synchronizes to the local grid/electrical panel.

Expansion turbines operate with pressure difference across the inlet and outlet of the turbine blades. This pressure difference produces net thrust load on the rotating assembly. In order to protect the thrust bearings from excessive thrust load, the thrust forces have to be balanced. In traditional expansion turbines the outlet pressure of the machine is internally or externally connected to the back of the wheel to balance the pressure forces. In cryogenic expanders, such an arrangement may cause loss of expensive cold gas energy and machine reliability problems allowing cold gas to leak behind the turbine wheel.

Figure 2:
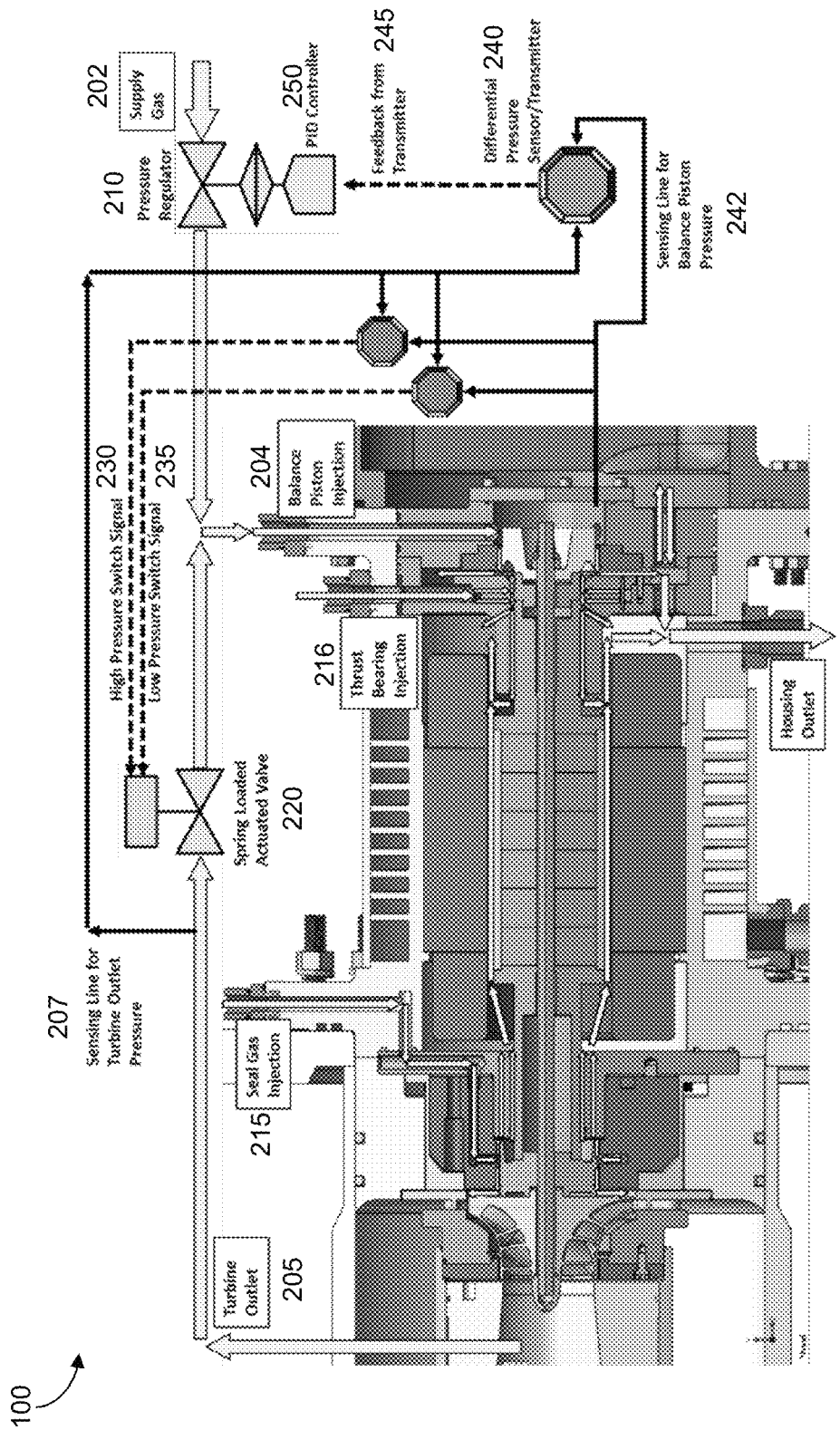
FIG. 2 is a schematic representation of a gas injection and thrust control system for use with the cryogenic oil-free direct drive turbogenerator of FIG. 1.

The present invention provides a method wherein a small amount of supply gas 202 is bled from warmer locations of the process plant and injected 204 in a thrust balance piston cavity of a balance piston 180 to manage the thrust load. The pressure at the outlet of the turbine 205, which is detected using sensing line 207, and the balance piston cavity is maintained through a pressure regulator 210. FIG. 2 shows the schematic of seal gas injection 215, thrust cooling gas injection 216 and thrust protection by injecting at the balance piston location using a pressure regulator 210.

In an emergency pressure regulator failure or malfunctioning situation when the pressure at the turbine outlet 205 is not matched with balance piston cavity, an emergency spring-loaded valve 220 will temporarily open to connect the turbine outlet 205 to the balance piston cavity to cancel out the net thrust. The spring-loaded valve 220 is configured in such a way that it will slow close and fast open to respond by opening fast for pressure differentials and close slowly to allow the pressure regulator 210 to catch up and maintain the pressure balance.

The spring-loaded valve 220 can respond to both a high-pressure switch signal 230 and a low-pressure switch signal 235. These signals 230, 235 may be provided by a differential pressure sensor/transmitter 240. The differential pressure sensor/transmitter 240 has a sensing line 242 for detecting the balance piston pressure. Feedback 245 from the differential pressure sensor/transmitter 240 may also be provided to a proportional integral derivative (PID) Controller 250.

Efficiency of expansion turbine to reduce the temperature of the process gas by expanding the pressure energy through the blades depends on the optimum rotational speed of the turbine wheel. Due to high pressure difference the expansion turbines operate at high speeds. Speed control of the expansion turbine by adjusting the load on the rotating assembly is critical to achieve high efficiency to reduce the specific energy consumption of liquefaction. The present invention provides a unique method of load and speed control of the expansion turbine wherein a power electronics system with high frequency capable switches are used to adjust the current load on the generator. Since the switches can operate at a wide range of switching frequencies the current output of the generator is easily changed to achieve the required optimum speed of operation.

Figure 3:
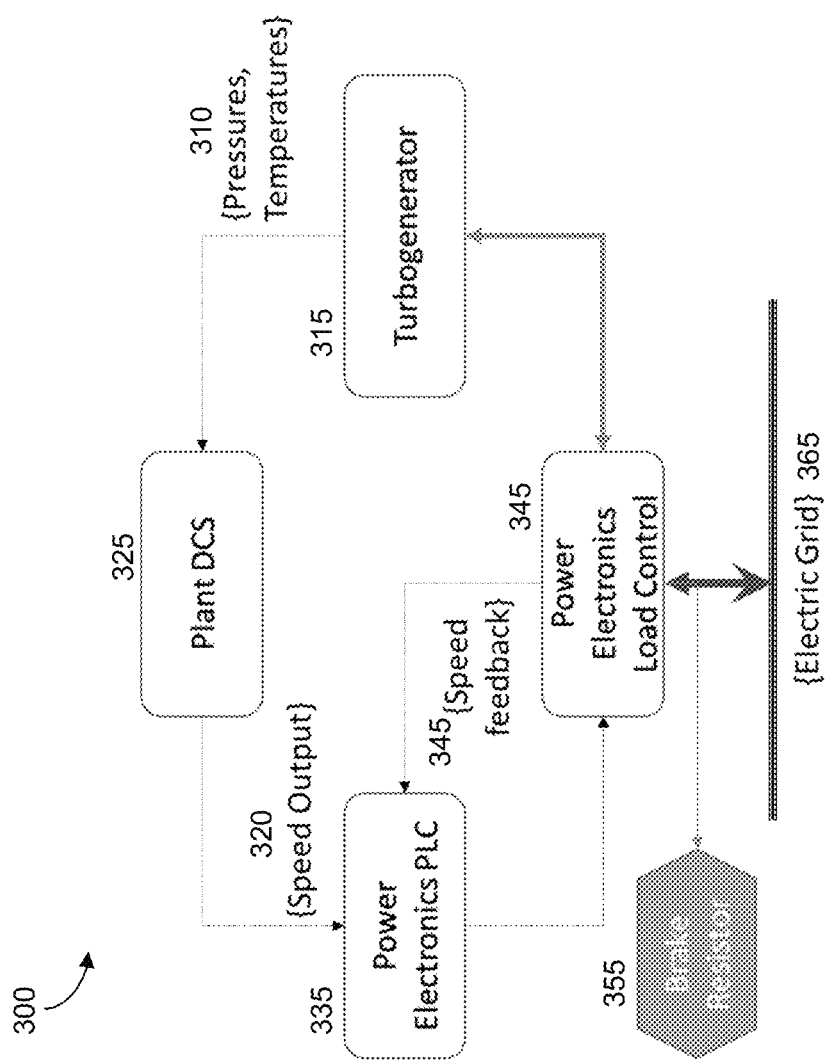
FIG. 3 is a turbogenerator speed control flow diagram for turbogenerators in accordance with the present invention.

The control algorithm 300 is generally shown in the FIG. 3 flow diagram wherein the pressure and temperature measurements 310 from the turbogenerator 315 is fed into the plant data collection system (DCS) 325 and an optimum speed 320 is estimated using a mathematical expression. From the speed output 320, the power electronics 335 switching frequency is controlled and a corresponding load is achieved to reach the speed using the power electronics load control 345. The power electronics system has internal algorithms for speed feedback 340 to reach steady state stably.

In case of an emergency shutdown, where the power electronics system loses its contact with the grid 365 to transfer the power, the loading is transferred to a resistor bank 355 which brakes the turbogenerator to a quick shutdown by dissipating all the rotating energy as heat through the resistors.

An embodiment provides a turbogenerator with a configuration that includes a turbine and an electrical generator, and which is connected to a power electronics system for transferring power generated thereby to a grid or electrical panel.

In a further embodiment of the turbogenerator above, the turbine includes a turbine housing, and the electrical generator includes a generator housing. Thermal isolation is accomplished between the turbine housing and the generator housing through a thermal choke, an insulator, and a skinny section turbine case design configuration to reduce cold leak in stationary components of the turbogenerator.

In another embodiment of any one of the turbogenerators above, the cold leak of a process gas through the rotating turbine is reduced through a low conductivity insulator insert.

In a further embodiment of any one of the turbogenerators above, cold process gas is blocked from entering the generator section of the turbogenerator through seal gas injection and thrust bearing cooling is achieved through a radial injection of a warm process gas through a housing port into a thrust cavity and a balance piston injection provision to balance thrust. A pressure differential between an eye of the turbine and the back end of a rotating shaft assembly disposed therein may be achieved through a PID controlled pressure regulator. A pilot-operated emergency fast responding valve may be positioned to connect the turbine eye to a balance piston cavity, said valve operating in an on/off manner in case of a regulator failure or malfunctioning.

In another embodiment of any one of the turbogenerators above, the hermetical sealing of the turbogenerator is achieved through a double O-ring and C-seal configuration to eliminate loss of expensive gas molecules from within the turbogenerator. The turbogenerator may also include a feedthrough electrical termination arrangement wherein the generated electricity is transferred from the process gas side of the turbogenerator to the outside of the turbogenerator without leaking gas molecules.

In a further embodiment of any one of the turbogenerators above, the power generated from the generator is rectified actively through the power electronics system to transfer the power to the grid and thereafter synchronizing to the grid frequency and voltage.

In another embodiment of any one of the turbogenerators above, the turbine also includes a turbine wheel that is aligned to a nozzle plate which directs the flow from within the turbine housing into the blade path of the turbine wheel, whereby operation of the turbine wheel expands the process gas to produce cryogenic gas that is diffused through a diffuser.

In a further embodiment of any one of the turbogenerators above, the generator includes a stator that is pressed inside the generator housing and cooled through a coolant jacket that has a coolant therein. The coolant carries the heat away through a fin arrangement disposed on the generator housing.

In another embodiment of any one of the turbogenerators above, the turbine includes a rotating turbine wheel that is secured by a tie rod which is connected to a rotating shaft assembly mounted within at least the turbine housing with at least a pair of journal bearings and thrust bearings to handle radial and axial loads applied thereto during rotational operation correspondingly.

In a further embodiment of any one of the turbogenerators above, the rotating shaft assembly includes a rotating element comprising a portion of the generator, said rotating generator element being secured within the generator housing by a non-magnetic sleeve through press fit, said sleeve being welded to the ends of the rotating generator element. The rotating assembly may be assembled with a thrust disc to operate against thrust bearings and connected to a balance piston which balances the net thrust load on a wire housing end of the turbogenerator.

In another embodiment of any one of the turbogenerators above, the turbogenerator also includes a rotating assembly that is mounted at least inside the generator housing, and which can be installed inside the turbine housing as a cartridge piloted through the inner diameter of the turbine housing.

In a further embodiment of any one of the turbogenerators above, the turbogenerator also includes a generator lead wire that is sealed by feedthrough power studs and which transfers the power from inside the turbogenerator to outside through a hermetical seal arrangement. The generator lead wire and the feedthrough power studs may be secured in place by a wire housing.

In another embodiment of any one of the turbogenerators above, the turbine housing and the generator housing are connected together by bolt joints having double O-ring and C-seal sealing arrangements to hermetically seal the turbogenerator to prevent the process gas from leaking out of the turbine and generator housings. Process gas may be permitted to leak from the turbine housing through a labyrinth seal that is drained through a drain port and fed back into the main turbine housing providing zero leakage of process gas from within the turbine housing to the outside. The leaked process gas may also be used to cool a journal bearing assembly and a thrust bearing assembly disposed within the turbine housing to mount a rotating assembly therein.

In a further embodiment of any one of the turbogenerators above, the turbogenerator also includes a rotating shaft assembly disposed within at least the turbine of the turbogenerator, and a thrust balance cavity formed by a cap and a holder for injecting pressurized gas to maintain zero differential pressure between a turbine eye and the back end of the rotating shaft assembly.

Another embodiment provides a speed control scheme in association with any one of the turbogenerators and power electronics systems as defined above. The calculated speed is used for load adjustment. The turbogenerator may also include a protection mechanism for machine overspeed wherein from a situation of fault or emergency shutdown the power generated from the generator is dissipated in a brake resistor.

The foregoing description of the embodiments of the invention has been presented for the purpose of illustration and description. It is not intended to be exhaustive or to limit the invention to the form disclosed. Obvious modifications and variation are possible in light of the above disclosure. The embodiments described were chosen to best illustrate the principles of the invention and the practical applications thereof to enable one of ordinary skill in the art to utilize the invention in various embodiments and with various modifications as suited to the particular use(s) contemplated.

What is claimed is:

1. A turbogenerator comprising:
   a turbine section having a turbine; and
   a generator section having a thrust bearing and a balance piston,
   wherein the turbogenerator is configured to inject seal gas so as to block cold process gas from entering the generator section,
   wherein the turbogenerator is configured to radially inject process gas through a housing port into a thrust cavity so as to cool the thrust bearing, and
   wherein the turbogenerator is configured to inject supply gas into a cavity of the balance piston.

2. The turbogenerator as defined in claim 1, further comprising a proportional integral derivative (PID) controlled pressure regulator configured to maintain a pressure differential between the turbine and the back end of a rotating shaft assembly disposed therein.

3. The turbogenerator as defined in claim 2, further comprising a pilot-operated emergency fast responding valve positioned to connect the turbine to the cavity of the balance piston, said pilot-operated emergency fast responding valve operating in an on/off manner in case of a regulator failure or malfunctioning.

4. A turbogenerator as defined in claim 1, further comprising an electrical generator connected to the turbine and a power electronics system connected to the electrical generator, the power electronics system configured to transfer power generated by the electrical generator to a grid or electrical panel.

5. The turbogenerator as defined in claim 4, further comprising a feedthrough electrical termination arrangement,
   wherein power generated is transferred from the process gas side of the turbogenerator to the outside of the turbogenerator via the feedthrough electrical termination arrangement without leaking gas molecules.

6. The turbogenerator as defined in claim 4, wherein the power generated from the electrical generator is rectified actively through the power electronics system to transfer the power to the grid and synchronized to the grid frequency and voltage.

7. The turbogenerator as defined in claim 4, further comprising a generator lead wire that is sealed by feedthrough power studs, the lead wire configured to transfer the power generated from inside the turbogenerator to outside the turbogenerator through a hermetical seal arrangement.

8. The turbogenerator as defined in claim 7, further comprising a wire housing configured to secure the generator lead wire and the feedthrough power studs.

9. The turbogenerator as defined in claim 1, wherein the turbine section and the generator section are connected together by bolt joints, each bolt joint having a double O-ring and C-seal sealing arrangement configured to hermetically seal the turbogenerator and to prevent the process gas from leaking out of the turbine and generator housings.

10. The turbogenerator as defined in claim 9, wherein process gas is permitted to leak from the turbine section through a labyrinth seal that is drained through a drain port and fed back into the turbine section providing zero leakage of process gas from within the turbine section to the outside.

11. The turbogenerator as defined in claim 10, wherein the leaked process gas is used to cool a journal bearing assembly and a thrust bearing assembly disposed within the turbine section, the thrust bearing assembly being configured to mount a rotating assembly therein.

12. The turbogenerator as defined in claim 1, wherein the turbine section comprises a turbine housing and the electrical generator section comprises a generator housing, and
   wherein thermal isolation is accomplished between the turbine housing and the generator housing through a thermal choke, an insulator, and a skinny section turbine case design configuration to reduce cold leak in stationary components of the turbogenerator.

13. The turbogenerator as defined in claim 1, further comprising a low conductivity insulator insert configured to reduce leakage of the process gas through the turbine while the turbine is rotating.

14. The turbogenerator as defined in claim 1, wherein the turbogenerator comprises a double O-ring and C-seal configuration to eliminate loss of expensive gas molecules from within the turbogenerator.

15. The turbogenerator as defined in claim 14, wherein the double O-ring and C-seal configuration hermetically seals the turbogenerator.

16. The turbogenerator as defined in claim 1, wherein the turbine section comprises a turbine wheel that is aligned to a nozzle plate configured to direct the flow from within the turbine housing into a blade path of the turbine wheel, wherein operation of the turbine wheel expands the process gas to produce cryogenic gas that is diffused through a diffuser.

17. The turbogenerator as defined in claim 1, wherein the generator section comprises a stator pressed inside a generator housing and cooled through a coolant jacket having a coolant therein, wherein the coolant is configured to carry the heat away through a fin arrangement disposed on the generator housing.

18. The turbogenerator as defined in claim 1, further comprising a rotating shaft assembly having a rotating element, the rotating generator element being secured within the generator section by a non-magnetic sleeve through pressfit, the non-magnetic sleeve being welded to the ends of the rotating generator element.

19. The turbogenerator as defined in claim 18, wherein the rotating assembly further comprises a thrust disc configured to operate against thrust bearings and connected to a balance piston which balances the net thrust load on a wire housing end of the turbogenerator.

20. The turbogenerator as defined in claim 1, further comprising:
- a rotating shaft assembly disposed within at least the turbine section of the turbogenerator; and
- a cap and a holder assembly defining a thrust balance cavity configured to receive injected pressurized gas and to maintain zero differential pressure between a turbine eye and a back end of the rotating shaft assembly.

\* \* \* \* \*